United States Patent
Frank et al.

(10) Patent No.: US 10,065,496 B2
(45) Date of Patent: Sep. 4, 2018

(54) FILLER NECK CLOSURE WITH DRAINAGE SYSTEM

(71) Applicant: Stant USA Corp., Connersville, IN (US)

(72) Inventors: Louis T. Frank, Connersville, IN (US); Joshua L. Rude, Connersville, IN (US); Paul C. Wetzel, II, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 15/268,010

(22) Filed: Sep. 16, 2016

(65) Prior Publication Data

US 2017/0072789 A1 Mar. 16, 2017

Related U.S. Application Data

(60) Provisional application No. 62/219,435, filed on Sep. 16, 2015.

(51) Int. Cl.
*B60K 15/04* (2006.01)

(52) U.S. Cl.
CPC ........ *B60K 15/04* (2013.01); *B60K 2015/047* (2013.01); *B60K 2015/048* (2013.01); *B60K 2015/0429* (2013.01); *B60K 2015/0461* (2013.01)

(58) Field of Classification Search
CPC .............. B60K 15/04; B60K 2015/047; B60K 2015/048; B60K 2015/0429; B60K 2015/0461
USPC ........................................ 141/350; 220/86.2
See application file for complete search history.

(56) References Cited

U.S. PATENT DOCUMENTS

| | | | | |
|---|---|---|---|---|
| 5,465,861 A * | 11/1995 | Kunz | ..................... | B60K 15/04 141/312 |
| 6,189,581 B1 * | 2/2001 | Harris | ..................... | B60K 15/04 137/588 |
| 6,446,826 B1 * | 9/2002 | Foltz | ..................... | B60K 15/04 220/203.01 |
| 6,539,990 B1 * | 4/2003 | Levey | ................ | B60K 15/0406 141/301 |
| 7,882,862 B2 | 2/2011 | DeCapua et al. | | |
| 7,926,522 B2 * | 4/2011 | Aitken | ................... | B60K 15/04 141/301 |
| 8,087,434 B2 * | 1/2012 | Stephan | ............. | B60K 15/0406 141/301 |
| 8,215,290 B2 | 7/2012 | Dunkle et al. | | |
| 8,347,914 B2 * | 1/2013 | Runarvot | ............... | B60K 15/04 137/588 |
| 9,266,428 B2 * | 2/2016 | Kobayashi | ............. | B60K 15/05 |
| 2005/0155671 A1 | 7/2005 | McClung et al. | | |
| 2007/0018131 A1 | 1/2007 | Bar | | |

(Continued)

FOREIGN PATENT DOCUMENTS

WO 2015094505 A1 6/2015

OTHER PUBLICATIONS

Written Opinion issued in connection with International Application No. PCT/US2016/052265, dated Dec. 20, 2016, 4 pages.

*Primary Examiner* — Timothy L Maust
(74) *Attorney, Agent, or Firm* — Barnes & Thornburg LLP (57) ABSTRACT

A fuel-tank filler apparatus includes a fuel-tank filler neck and a filler neck closure. A flapper door is provided to control access to a fuel-conducting passageway formed in the fuel-tank filler neck.

14 Claims, 6 Drawing Sheets

(56) References Cited

U.S. PATENT DOCUMENTS

2010/0012223 A1   1/2010  Yoshida
2011/0079322 A1*  4/2011  Beier ................. B60K 15/0406
                                                              141/350
2014/0061192 A1   3/2014  Aitken et al.
2017/0072789 A1*  3/2017  Frank .................... B60K 15/04

* cited by examiner

FILLER NECK CLOSURE WITH DRAINAGE SYSTEM

PRIORITY CLAIM

This application claims priority under 35 U.S.C. § 119 (e) to U.S. Provisional Application No. 62/219,435, filed Sep. 16, 2015, which is expressly incorporated by reference herein.

BACKGROUND

The present disclosure relates to a filler neck closure for a tank filler neck. More particularly, the present disclosure relates to a closure that permits a fuel-dispensing nozzle to be inserted into a tank filler neck to supply fuel to a fuel tank and closes the tank filler neck when the fuel-dispensing nozzle is removed from the closure.

Many vehicles include a fuel tank, a tank filler neck coupled to the fuel tank to communicate liquid fuel from a fuel-dispensing nozzle to the tank, and a closure coupled to the fuel tank filler neck to seal the fuel-tank filler neck. During refueling, the fuel-dispensing nozzle is passed by a user first through an outer chamber associated with an outer end of the fuel-tank filler neck that is open to the atmosphere and then through a nozzle-receiving aperture into a fuel-conducting passageway formed in the tank filler neck. Then the nozzle is actuated by the user to cause liquid fuel discharged by the nozzle to flow through the fuel-conducting passageway into the fuel tank.

SUMMARY

According to the present disclosure, a fuel-tank filler apparatus comprises a filler neck closure that is adapted to be coupled to a fuel-tank filler neck. In illustrative embodiments, the filler neck closure is a capless system that includes a nozzle-insertion housing that is configured to mate with an outer end of a fuel-tank filler neck and formed to include an outer chamber and a nozzle-receiving aperture that is located to interconnect the outer chamber in fluid communication with a fuel-conducting passageway formed in the fuel-tank filler neck when the nozzle-insertion housing is mated with the outer end of the fuel-tank filler neck.

In illustrative embodiments, the fuel-tank filler apparatus further includes a spring-biased nozzle-actuated inner flapper door mounted on the nozzle-insertion housing for movement relative to the nozzle-insertion housing between a closed position closing the nozzle-receiving aperture formed in the nozzle-insertion housing and an opened position opening that nozzle-receiving aperture. During refueling, the tip of the fuel-dispensing nozzle is moved by a user through the outer chamber and the nozzle-receiving aperture to engage the normally closed inner flapper door and then move the inner flapper door against a closing force applied by a companion spring to the opened position. The nozzle tip is then moved past the inner flapper door into the fuel-conducting passageway formed in the fuel-tank filler neck to dispense fuel into the fuel-conducting passageway.

In illustrative embodiments, the nozzle-insertion housing is formed to include a drainage conduit that is configured to drain any liquid extant in the outer chamber toward the surroundings outside of the nozzle-insertion housing. An inlet end of the drainage conduit communicates with the outer chamber and any liquid collected therein. An outlet end of the drainage conduit formed in the nozzle-insertion housing is aligned with a drainage hole formed in the fuel-tank filler neck to allow collected liquid exiting the outer chamber via the drainage conduit to flow through the drainage hole formed in the fuel-tank filler neck to fall under gravity onto ground underlying the fuel tank filler neck so that such collected liquid does not inadvertently flow into the fuel-conducting passageway formed in the fuel-tank filler neck in a direction toward the fuel tank the next time the inner flapper door is opened.

In illustrative embodiments, the filler neck closure further includes drain-controller means for allowing flow of collected liquid from the outer chamber into the drainage conduit while the inner flapper door occupies the closed position and for blocking flow of collected liquid from the outer chamber into the drainage conduit when the inner flapper door is moved relative to the nozzle-insertion housing to assume an opened position. In an illustrative embodiment, the nozzle-insertion housing is formed to include an inclined plug-motion channel that is arranged to communicate with the drainage conduit and cooperate with a movable drainage plug to define the drain-controller means.

In illustrative embodiments, the drainage plug is mounted for movement in the inclined plug-motion channel between a conduit-closing position blocking flow of collected liquid from the outer chamber though the drainage conduit to the outlet end of the drainage conduit and a conduit-opening position allowing flow of collected liquid from the outer chamber though the drainage conduit to the outlet end so that any collected liquid extant in the outer chamber can drain to the surroundings through the drainage conduit formed in the nozzle-insertion housing and the drainage hole formed in the fuel-tank filler neck. In illustrative embodiments, the drainage plug is weighted and arranged to slide downwardly in the inclined plug-motion channel under gravity normally to assume the conduit-closing position as long as the inner flapper door occupies an opened position. The inner flapper door is configured and arranged to provide means for moving the drainage plug upwardly in the inclined plug-motion channel away from the conduit-closing position to assume a conduit-opening position upon movement of the inner flapper door to its closed position.

In illustrative embodiments, the drainage plug moves to open and close a drain area defined by the outer chamber formed in the nozzle-insertion housing in the filler neck closure. When the inner flapper door is closed the inner flapper door will hold the drainage plug in a drainage conduit-opening position. When the inner flapper door is opened by the fuel-dispensing nozzle during fuel tank refueling the drainage plug will move relative to the nozzle-insertion housing to close the drainage conduit.

In illustrative embodiments, the filler neck closure is a capless unit that is coupled to the outer end of the fuel-tank filler neck and is configured to include a spring-biased nozzle-actuated outer flapper door mounted on the nozzle-insertion housing and arranged to lie in spaced-apart relation to the spring-biased inner flapper door. When both of the inner and outer flapper doors are closed, the drainage plug is arranged to lie between the inner and outer flapper doors in a relatively high-elevation position in the inclined plug-motion channel away from the inlet of the drainage conduit to allow any liquid extant in the outer chamber to flow into the drainage conduit and drain to the surroundings. During a fuel-tank refueling activity, the tip of the fuel-dispensing nozzle first engages and pushes the outer flapper door to an opened position and then engages and pushes the inner flapper door to an opened position to free the drainage plug to move away from the outer flapper door to a relatively low-elevation position in the inclined plug-motion channel to cover the inlet opening into the drainage conduit so that any liquid (e.g., liquid fuel discharged by the fuel-dispensing nozzle) extant in the outer chamber formed in the nozzle-insertion housing is blocked from discharge through the drainage conduit to the surroundings outside of the fuel-tank filler neck.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 1 is a sectional view of a fuel tank filler apparatus in accordance with the present disclosure showing an illustrative filler neck closure including a nozzle-insertion housing mounted in an outer end of a fuel-tank filler neck, a spring-biased nozzle-actuated outer flapper door yieldably biased to assume a closed position closing an outer aperture formed in the filler neck closure, a spring-biased nozzle-actuated inner flapper door yieldably biased to assume a closed position closing a nozzle-receiving aperture formed in a bottom wall of the nozzle-insertion housing, and a drain controller positioned to lie between the closed inner and outer flapper doors to control flow of any liquid collected in the filler neck closure to the surroundings as suggested in FIGS. 1A (drain opened) and 2 (drain closed);

FIG. 1A is an enlarged view taken from the circled region of FIG. 1 showing a negatively sloping drainage conduit formed in the nozzle-insertion housing to communicate with an outer chamber also formed in the nozzle-insertion housing along with a positively sloping inclined plug-motion channel formed in the nozzle-insertion housing to intersect and communicate with an upper section of the negatively sloping drainage conduit and showing that an edge portion of the inner flapper door has engaged a left side of a drainage plug that is mounted for sliding movement in the inclined plug-motion channel to retain the drainage plug in a raised conduit-opening position in an upper section of the inclined plug-motion channel to allow any collected liquid extant in the outer chamber to flow to the surroundings through the drainage conduit;

FIG. 2 is a sectional view similar to FIG. 1 showing that (during fuel tank refueling) a user has moved a tip of a fuel-dispensing nozzle past the outer flapper door and through the outer chamber and an inner nozzle-receiving aperture formed in the nozzle-insertion housing to move the spring-biased nozzle-actuated inner flapper door from a closed position temporarily to an opened position so that the nozzle tip extends into a fuel-conducting passageway formed in the fuel-tank filler neck and showing that the inner flapper door has disengaged the drainage plug to allow the drainage plug to move under gravity (to the left) from an upper section of the inclined plug-motion channel to a lower section of the inclined plug-motion channel from a conduit-opening position (shown in FIGS. 1 and 1A) to a conduit-closing position (also shown in FIG. 8) to block flow of any collected liquid extant in the outer chamber through the drainage conduit to the surroundings;

DETAILED DESCRIPTION

Figure 1:
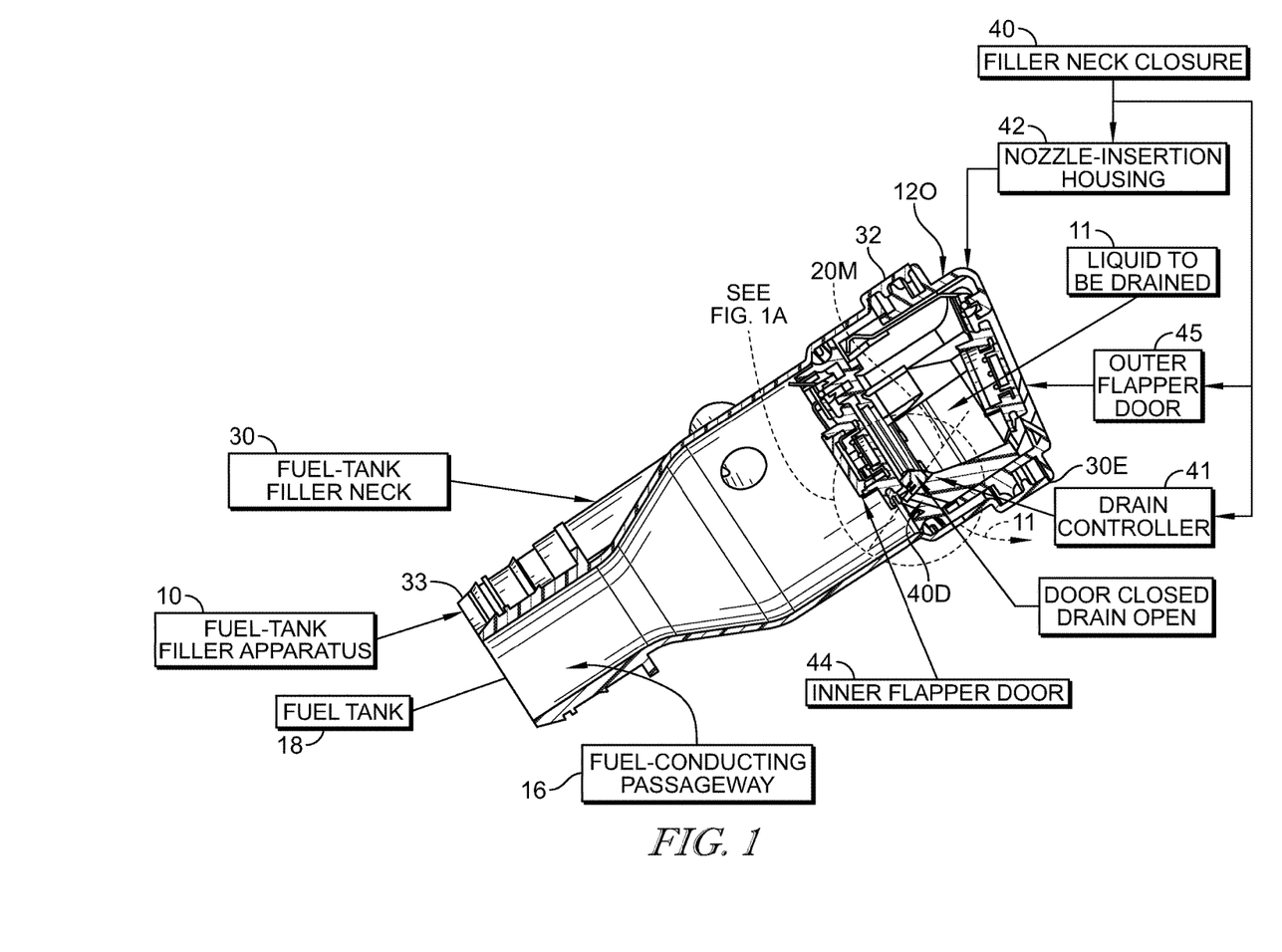
Figure 1A:
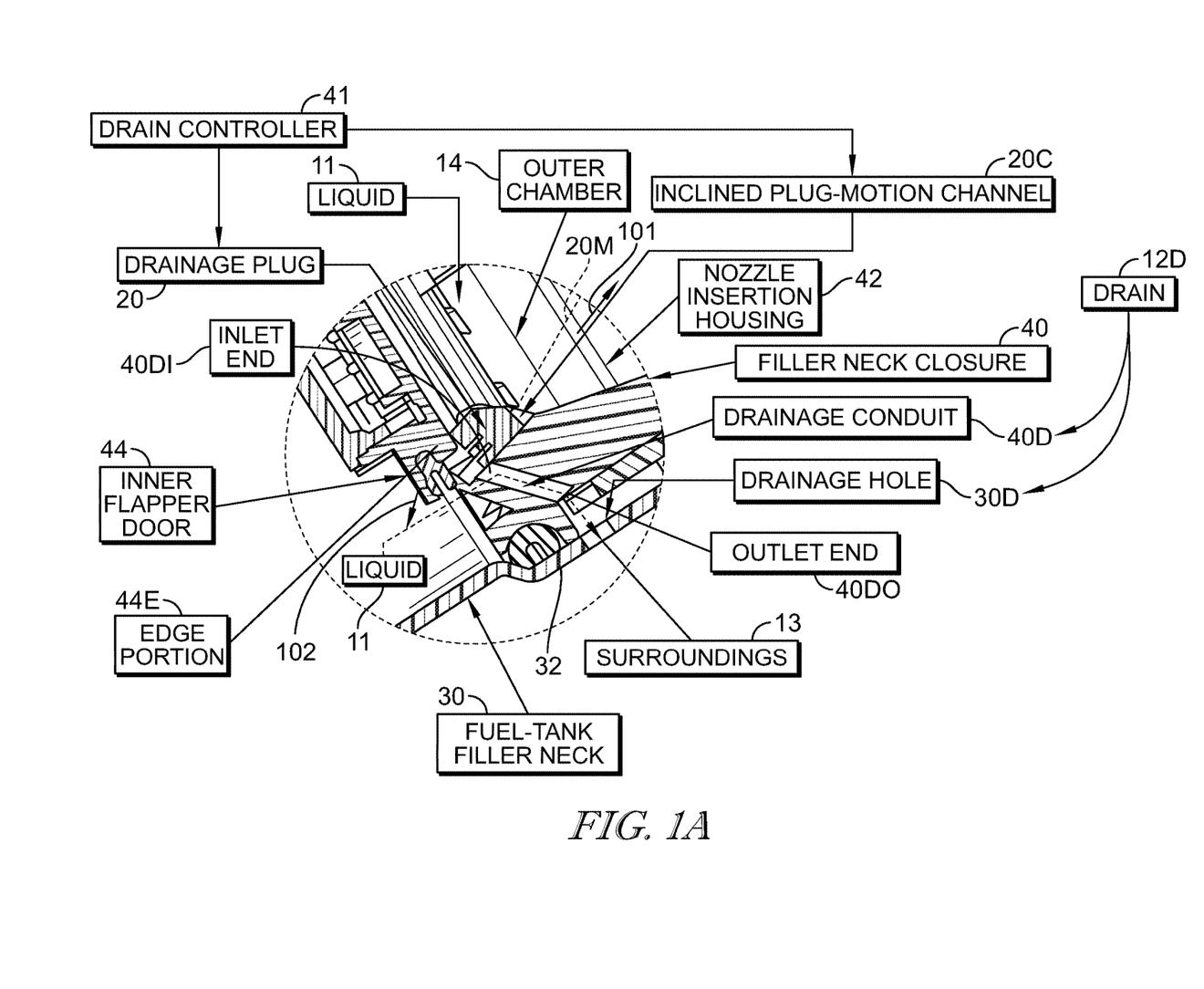

A fuel-tank filler apparatus 10 includes a fill tube 12 formed to include an outer chamber 14 located at an outer end 12O of fill tube 12 and a fuel-conducting passageway 16 arranged to extend from outer chamber 14 to a fuel tank 18 associated with fill tube 12 as suggested in FIGS. 1 and 1A. Fill tube 12 is formed to include drain means 12D for draining liquid 11 extant in outer chamber 14 to the surroundings 13 outside of fill tube 12 as suggested diagrammatically in FIGS. 1 and 1A. Fuel-tank filler apparatus 10 further includes a drainage plug 20 that is mounted for movement in a plug-motion channel 20C formed in fill tube 12 to close an inlet 40DI opening into drain 12D in response to movement of a fuel-dispensing nozzle 50 through outer chamber 14 and into fuel-conducting passageway 16 during refueling of fuel tank 18 to block flow of liquid 11 from the outer chamber 14 to the surroundings 13 outside of fill tube 12 through the drain 12D as suggested in FIG. 2.

Fill tube 12 includes a fuel-tank filler neck 30 and a filler neck closure 40 coupled to fuel-tank filler neck 30 as suggested in FIG. 1. In illustrative embodiments, filler neck closure 40 is a capless system that includes a nozzle-insertion housing 42 configured to mate with an outer end 32 of fuel-tank filler neck 30. Nozzle-insertion housing 42 is formed to include a drainage conduit 40D that cooperates with a drainage hole 30D formed in outer end 32 of fuel-tank filler neck 30 to define drain 12D as suggested in FIGS. 1, 1A, and 2.

Figure 2:
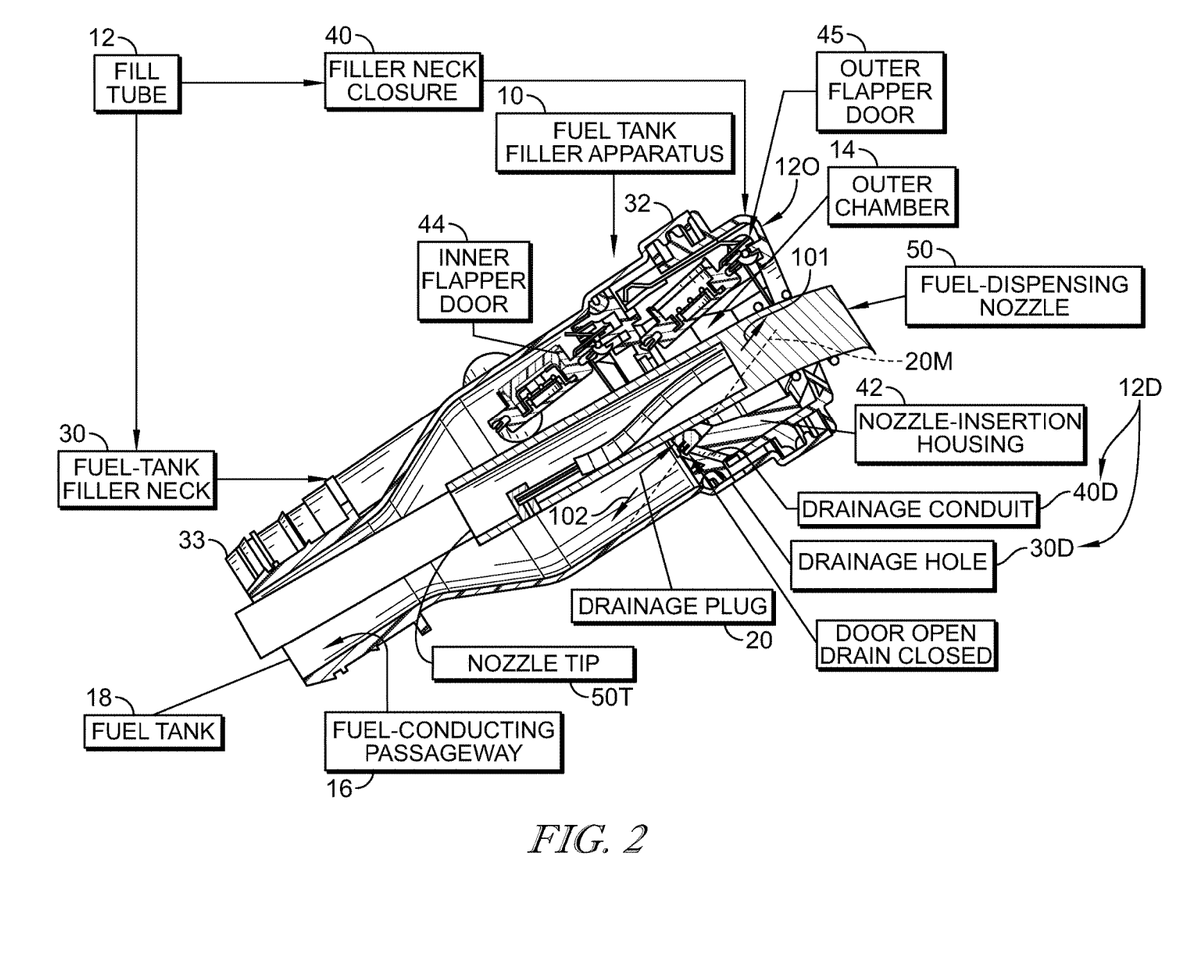

Drainage plug 20 is mounted to slide back and forth along a plug-motion path 20M that extends generally in an axial direction through the fill tube 12 as shown, for example, in FIGS. 1, 1A, and 2. Drainage plug 20 is moved in an outward direction 101 closer to the outermost end 30E of fuel-tank filler neck 30 along plug-motion path 20M to open drain 12D when no fuel-dispensing nozzle 50 is inserted into fill tube 12 as shown in FIG. 1A. In contrast, drainage plug 20 is allowed to move in an opposite inward direction 102 away from the outermost end 30E of fuel-tank filler neck 30 along plug-motion path 20M to close drain 12D when a fuel-dispensing nozzle 24 is inserted into fill tube 12 during a tank-refueling activity as shown in FIG. 2.

A spring-biased nozzle-actuated inner flapper door 44 is mounted on an inner end of nozzle-insertion housing 42 for pivotable movement between opened and closed positions as shown, for example, in FIGS. 1 and 2. Drainage plug 20 is movable relative to nozzle-insertion housing 42 to open and close off drain 12D. When inner flapper door 44 is closed as shown in FIGS. 1 and 1A, inner flapper door 44 holds drainage plug 20 in an outer drainage-conduit opening position on plug-motion path 20M to open drain 12D so that any collected liquid 11 extant in the outer chamber 14 formed in nozzle-insertion housing 42 may flow through drain 12D to the surroundings 13 outside fill tube 12. Alternatively, when inner flapper door 44 is opened as shown in FIG. 2, owing to movement of fuel-dispensing nozzle 50 through the outer chamber 14 formed in nozzle-insertion housing 42 and into the fuel-conducting passageway 16 formed in fuel-tank filler neck 30 during fuel-tank refueling activity, drainage plug 20 is free to move under its own weight or a force applied by a spring (not shown) to close drain 12D in the inward direction 102 to assume an inner conduit-closing position on plug-motion path 20M to close drain 12D to block flow of any collected liquid 11 extant in the outer chamber 14 formed in nozzle-insertion housing 42 through drain 12D to the surroundings 13 outside fill tube 12.

According to the present disclosure, a fuel-tank filler apparatus 10 comprises a filler neck closure 40 that is adapted to be coupled to a fuel-tank filler neck 30 associated with fuel tank 18. Filler neck closure 40 includes a nozzle-insertion housing 42 that is configured to mate with an outer end 32 of fuel-tank filler neck 30. Housing 42 is formed to include an outer chamber 14 and a nozzle-receiving aperture 42O that is located to interconnect the outer chamber 14 in fluid communication with the fuel-conducting passageway 16 formed in fuel-tank filler neck 30 when nozzle-insertion housing 42 is mated with outer end 32 of fuel-tank filler neck 30. An inner end 33 of fuel-tank filler neck 30 is coupled to fuel tank 18.

Filler neck closure 40 includes a spring-biased nozzle-actuated inner flapper door 44 mounted on nozzle-insertion housing 42 for movement relative to nozzle-insertion housing 42 between a closed position closing the nozzle-receiving aperture 42O formed in nozzle-insertion housing 42 as suggested in FIGS. 1 and 1A and an opened position opening that nozzle-receiving aperture 42O as suggested in FIG. 2. During refueling, the tip 50T of the fuel-dispensing nozzle 50 is moved by a user through the outer chamber 14 and the nozzle-receiving aperture 42O to engage the normally closed inner flapper door 44 and then move the inner flapper door 44 against a closing force applied by a companion spring to the opened position. The nozzle tip 50T is then moved past the inner flapper door 44 into the fuel-conducting passageway 16 formed in the fuel-tank filler neck 30 as shown, for example, in FIG. 2.

Nozzle-insertion housing 42 is formed to include a drainage conduit 40D that is configured to drain any collected liquid 11 extant in the outer chamber 14 to the surroundings 13 outside of nozzle-insertion housing 42. An inlet end 40DI of drainage conduit 40D communicates with outer chamber 14. An outlet end 40DO of drainage conduit 40D is aligned with a drainage hole 30D formed in fuel-tank filler neck 30 to allow collected liquid 11 exiting outer chamber 14 via drainage conduit 40D to flow through drainage hole 30D formed in fuel-tank filler neck 30 to fall under gravity onto ground underlying the fuel-tank filler neck 30 so that such liquid 11 does not inadvertently flow into the fuel-conducting passageway 16 formed in the fuel-tank filler neck 30 ultimately to reach fuel tank 18 the next time the inner flapper door 44 is opened during a tank-refueling activity.

Filler neck closure 40 further includes drain controller 41 means for allowing flow of collected liquid 11 from outer chamber 14 into drainage conduit 40D while the inner flapper door 44 occupies the closed position as shown in FIGS. 1 and 1A and for blocking flow of collected liquid 11 from outer chamber 14 into drainage conduit 40D when the inner flapper door 44 is moved relative to nozzle-insertion housing 42 to assume an opened position as shown in FIG. 2. Nozzle-insertion housing 42 is formed to include an inclined plug-motion channel 20C arranged to communicate with the drainage conduit 40D and to define plug-motion path 20M. A drainage plug 20 is mounted for movement in the inclined plug-motion channel 20C along plug-motion path 20M between a conduit-closing position blocking flow of collected liquid 11 from outer chamber 14 though drainage conduit 40D to the outlet end 40DO of drainage conduit 40D and a conduit-opening position allowing flow of collected liquid 11 from outer chamber though drainage conduit 40D to the outlet end 40DO so that any collected liquid 11 extant in outer chamber 14 can drain to the surroundings 13 through the drainage conduit 40D.

In illustrative embodiments, drainage plug 20 is weighted and arranged to slide downwardly in the inclined plug-motion channel 20C along plug-motion path 20M under gravity normally to assume the conduit-closing position as long as the inner flapper door 44 occupies an opened position. The inner flapper door 44 is configured and arranged to provide means for moving drainage plug 20 upwardly in the inclined plug-motion channel 20C along plug-motion path 20M away from the conduit-closing position to assume a conduit-opening position upon movement of the inner flapper door 44 to its closed position as shown, for example, in FIGS. 1 and 1A.

Drainage plug 20 moves to open and close a drain area defined by the outer chamber 14 formed in the nozzle-insertion housing 42 in capless filler neck closure 40. When the inner flapper door 44 is closed the inner flapper door 44 will hold the drainage plug 20 in a drainage conduit-opening position as suggested in FIGS. 1 and 1A. When the inner flapper door 44 is opened by the fuel-dispensing nozzle 50 during fuel tank refueling activity, the drainage plug 20 will move relative to the nozzle-insertion housing 42 to close the drainage conduit 40D as suggested in FIG. 2. It is within the scope of the present disclosure to arrange the drainage plug 20 so the fuel-dispensing nozzle 50 itself pushes the drainage plug 20 down to the inner conduit-closing position. The drainage plug 20 may be spring-loaded or allowed to float freely in the inclined plug-motion channel 20C along the plug-motion path 12M in accordance with the present disclosure. The drainage conduit 40D is provided to drain unwanted collected liquid 11 extant in the outer chamber 14 of the nozzle-insertion housing 42. The movable drainage plug 20 is provide in accordance with the present disclosure to keep fuel from getting in the drainage conduit 40D when the fuel-dispensing nozzle 50 shuts off and fuel wells up in the fuel-tank filler neck 30 after shut off of fuel-dispensing nozzle 50.

Figures 3, 3A:
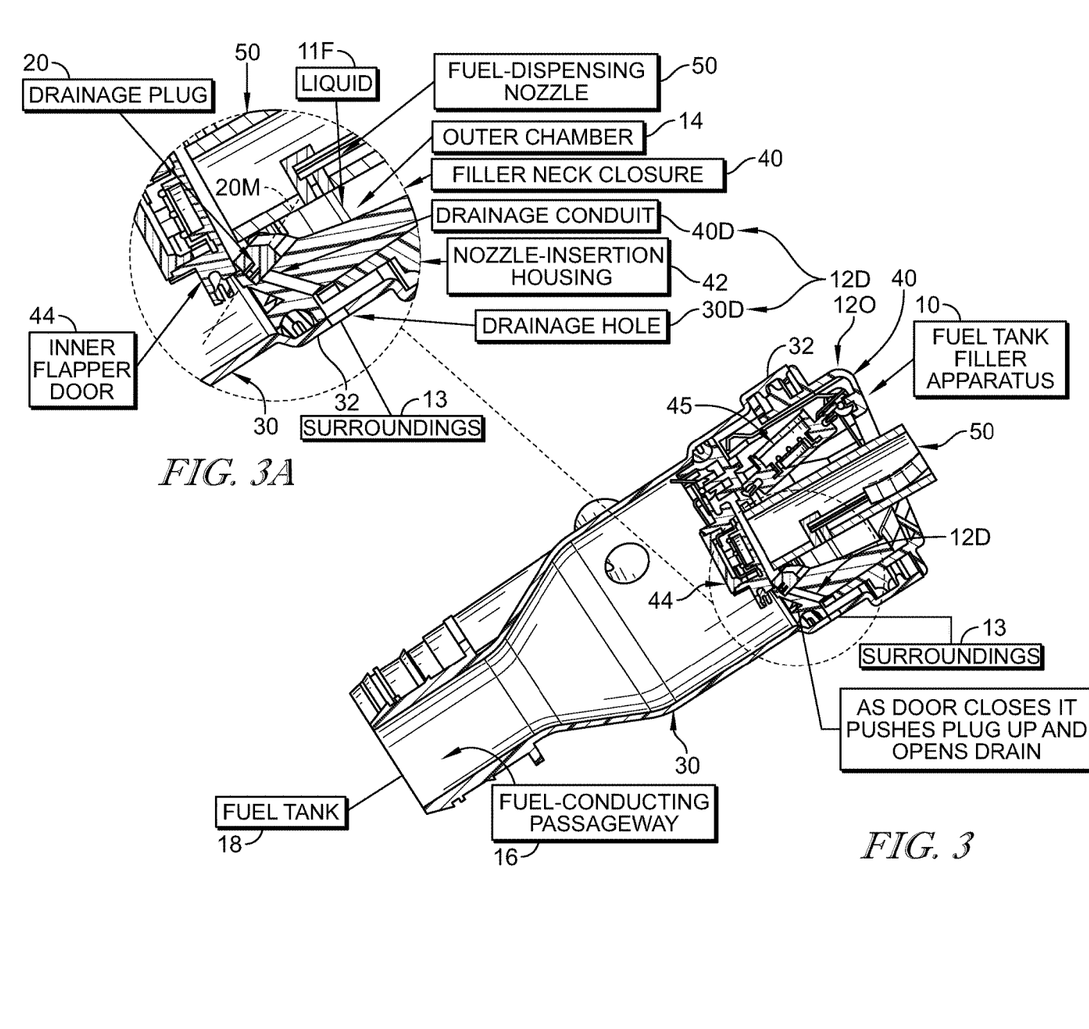
FIG. 3 is a sectional view similar to FIG. 2 showing withdrawal of the fuel-dispensing nozzle from the fuel tank filler neck after a tank-refueling activity has been completed to allow the inner flapper door to begin to close while the outer flapper door remains open.
FIG. 3A is an enlarged view taken form the circled region of FIG. 3 showing that the inner flapper door as it moves toward the closed position has engaged the drainage plug and begun to move the drainage plug upwardly in the inclined plug-motion channel toward the raised conduit-opening position while the outer flapper door remains in the opened position.
Figure 4:
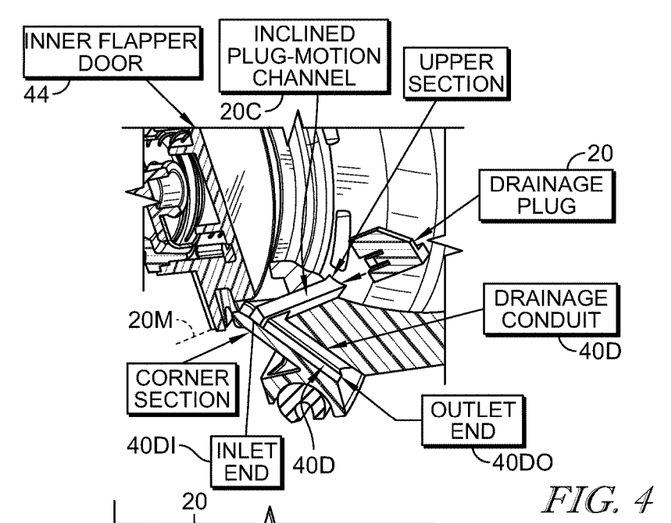
FIG. 4 is a partial exploded perspective assembly view of the filler neck closure of FIGS. 1-3 showing installation of the drainage plug into the inclined plug-motion channel formed in the nozzle-insertion housing through an end opening provided in the upper section of the inclined plug-motion channel.
Figure 5:
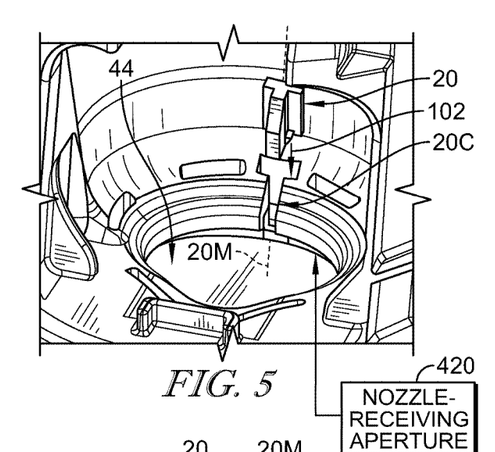
FIG. 5 is another perspective view of the drainage plug installation step shown in FIG. 4.
Figure 6:
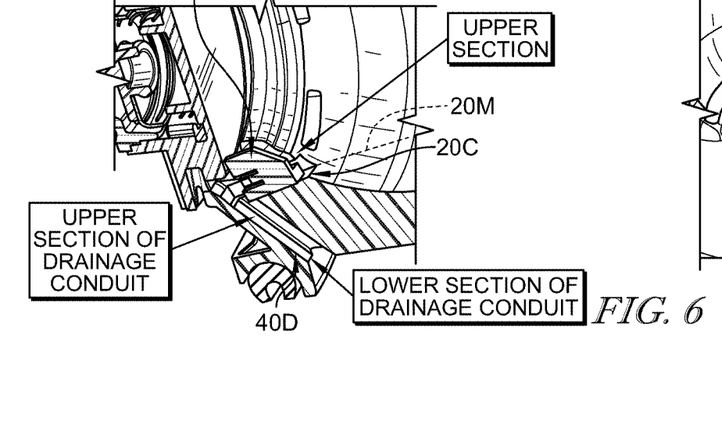
FIG. 6 is a partial perspective view of the drainage plug located in the raised conduit-opening position in an upper section of the inclined plug-motion channel and showing that a lower section of the inclined plug-motion channel intersects and communicates with an upper section of the drainage conduit formed in the nozzle-insertion housing.
Figure 7:
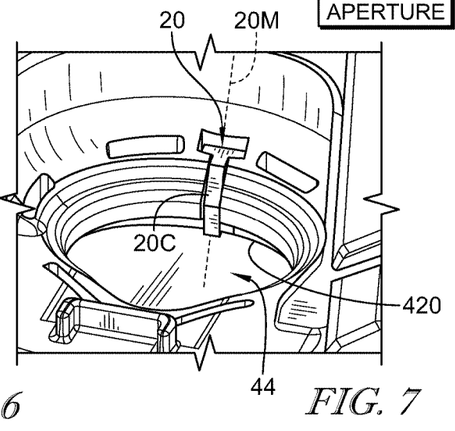
FIG. 7 is another perspective view of the drainage plug in the raised conduit-opening position in the inclined plug-motion channel formed in the nozzle-insertion housing.
Figure 8:
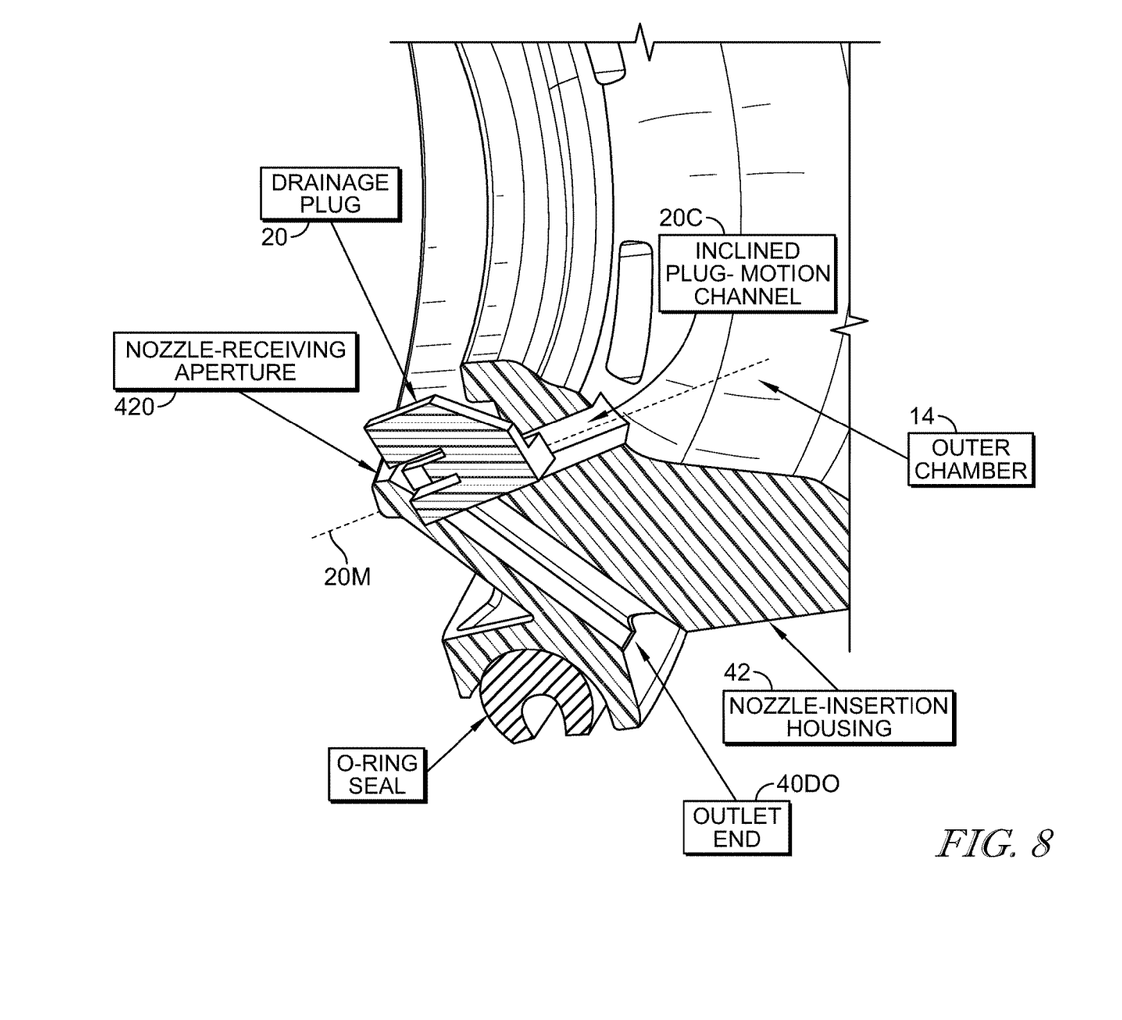
FIG. 8 is an enlarged partial perspective view of the drainage plug located in a lowered conduit-closing position in a lower section of the inclined plug-motion channel formed in the nozzle-insertion housing to block flow of any liquid in the outer chamber into the drainage conduit as long as the inner flapper door remains in an opened position.

In illustrative embodiments, filler neck closure 40 is a capless unit that is coupled to the outer end 32 of fuel-tank filler neck 30 and is configured to include a spring-biased nozzle-actuated outer flapper door 45 mounted on nozzle-insertion housing 42 and arranged to lie in spaced-apart relation to the spring-biased inner flapper door 44. When both of the inner and outer flapper doors 44, 45 are closed, drainage plug 20 is arranged to lie between the inner and outer flapper doors 44, 45 in a relatively high-elevation position in the inclined plug-motion channel 20M away from the inlet 40DI of the drainage conduit 40D to allow any liquid extant in outer chamber 14 to flow into drainage conduit 40D and drain to the surroundings 13 as suggested in FIGS. 1 and 1A. During a fuel-tank refueling activity, the tip 50T of the fuel-dispensing nozzle 50 first engages and pushes the outer flapper door 45 to an opened position and then engages and pushes the inner flapper door 44 to an opened position to free the drainage plug 20 to move away from the outer flapper door 45 to a relatively low-elevation position in the inclined plug-motion channel 20M to cover the inlet opening 40DI into the drainage conduit 40D so that any liquid 11F (e.g., liquid fuel discharged by the fuel-dispensing nozzle) extant in the outer chamber 14 formed in the nozzle-insertion housing 42 as shown in FIG. 3A is blocked from discharge through the drainage conduit 40D to the surroundings 13 outside of the fuel-tank filler neck 30.

The invention claimed is:

1. A fuel tank filler apparatus comprises
a fill tube formed to include an outer chamber adapted to receive a fuel-dispensing nozzle during a tank-refueling activity and a fuel-conducting passageway coupled in fluid communication to the outer chamber and adapted to conduct fuel dispensed by the fuel-dispensing nozzle to a fuel tank associated with the fill tube, the fill tube being formed to include a nozzle-receiving aperture that is located to interconnect the outer chamber in fluid communication with the fuel-conducting passageway, the fill tube also being formed to include a drain to conduct collected liquid extant in the outer chamber to surroundings outside of the fill tube, wherein the fill tube includes an inner end adapted to be coupled to a fuel tank and an opposite outer end adapted to receive a fuel-dispensing nozzle therein, the fill tube includes an outer chamber at the opposite outer end and a fuel-conducting passageway arranged to extend from the nozzle-receiving aperture associated with the outer chamber toward the fuel tank,
a nozzle-actuated inner flapper door mounted on the fill tube for movement relative to the fill tube to open and close the nozzle-receiving aperture, and
a drain controller including a drainage plug mounted for sliding movement in a plug-motion channel formed in the fill tube from a drain-opening position to a drain-closing position to close an inlet arranged to open into the drain and communicate with the outer chamber to block flow of liquid from the outer chamber through the drain in response to movement of the inner flapper door to the opened position.

2. The apparatus of claim 1, wherein the inner flapper door is arranged to engage the drainage plug during movement of the inner flapper door from the opened position to the closed position and is configured to provide means for moving the drainage plug in the plug-motion channel relative to the fill tube from the drain-closing position to the drain-opening position in response to movement of the inner flapper door from the opened position to the closed position.

3. Apparatus of claim 1, wherein the fill tube includes a fuel-tank filler neck adapted to be coupled at an inner end thereof to a fuel tank and a filler neck closure coupled to an opposite outer end of the fuel-tank filler neck, the filler neck closure includes a nozzle-insertion housing formed to include the outer chamber and the nozzle-receiving aperture and mated to the opposite outer end of the fuel-tank filler neck, and the nozzle-insertion housing is formed to include the drain.

4. The apparatus of claim 3, wherein the nozzle-insertion housing is formed to include a drainage conduit that is configured to drain any liquid extant in the outer chamber toward surroundings outside of the nozzle-insertion housing and an inlet end of the drainage conduit communicates with the outer chamber and any collected liquid therein.

5. The apparatus of claim 4, wherein the fuel-tank filler neck is formed to include a drainage hole aligned with an outlet end of the drainage conduit formed in the nozzle-insertion housing to cause the drainage hole to cooperate with the drainage conduit to define the drain formed in the fill tube.

6. The apparatus of claim 4, wherein the nozzle-insertion housing is formed to include an inclined plug-motion channel that is arranged to communicate with the drainage conduit and the filler neck closure further includes a drainage plug mounted for movement in the inclined plug-motion channel formed in the nozzle-insertion housing between a conduit-closing position blocking flow of collected liquid from the outer chamber through the drainage conduit to an outlet end of the drainage conduit and a conduit-opening position allowing flow of collected liquid from the outer chamber through the drainage conduit to the outlet end so that any collected liquid extant in the outer chamber can drain to surroundings through the drainage conduit.

7. The apparatus of claim 6, wherein the nozzle-actuated inner flapper door includes an edge portion that is arranged to engage the drainage plug and hold the drainage plug in the conduit-opening position when the nozzle-actuated inner flapper door occupies the closed position and the drainage plug is arranged to move in the inclined plug-motion channel formed in the nozzle-insertion housing to the conduit-opening position in response to movement of the nozzle-actuated inner flapper door to the opened position.

8. The apparatus of claim 7, wherein the fuel-tank filler neck is formed to include a drainage hole aligned with an outlet end of the drainage conduit formed in the nozzle-insertion housing to cause the drainage hole to cooperate with the drainage conduit to define the drain formed in the fill tube.

9. The apparatus of claim 6, wherein the filler neck closure further includes a nozzle-actuated outer flapper door mounted for movement relative to the nozzle-insertion housing to open and close an outer nozzle-receiving aperture opening into the outer chamber and the nozzle-actuated outer flapper door is arranged to lie in spaced-apart relation to the nozzle-actuated inner flapper door to locate the drainage plug therebetween when each of the inner and outer flapper doors is closed.

10. A fuel tank filler apparatus comprises
a fill tube formed to include an outer chamber adapted to receive a fuel-dispensing nozzle during a tank-refueling activity and a fuel-conducting passageway coupled in fluid communication to the outer chamber and adapted to conduct fuel dispensed by the fuel-dispensing nozzle to a fuel tank associated with the fill tube, the fill tube being formed to include a nozzle-receiving aperture that is located to interconnect the outer chamber in fluid communication with the fuel-conducting passageway, the fill tube also being formed to include a drain to conduct collected liquid extant in the outer chamber to surroundings outside of the fill tube, a nozzle-actuated inner flapper door mounted on the fill tube for movement relative to the fill tube to open and close the nozzle-receiving aperture, and a drain controller including a drainage plug mounted for movement from a drain-opening position to a drain-closing position to close the drain to block flow of liquid from the outer chamber through the drain in response to movement of the inner flapper door to the opened position, wherein the fill tube includes a fuel-tank filler neck adapted to be coupled at an inner end thereof to a fuel tank and a filler neck closure coupled to an opposite outer end of the fuel-tank filler neck, the filler neck closure includes a nozzle-insertion housing formed to include the outer chamber and the nozzle-receiving aperture and mated to the opposite outer end of the fuel-tank filler neck, and the nozzle-insertion housing is formed to include the drain, wherein the nozzle-insertion housing is formed to include a drainage conduit that is configured to drain any liquid extant in the outer chamber toward surroundings outside of the nozzle-insertion housing and an inlet end of the drainage conduit communicates with the outer chamber and any collected liquid therein, wherein the fuel-tank filler neck is formed to include a drainage hole aligned with an outlet end of the drainage conduit formed in the nozzle-insertion housing to cause the drainage hole to cooperate with the drainage conduit to define the drain formed in the fill tube, and wherein the nozzle-insertion housing is formed to include an inclined plug-motion channel that is arranged to communicate with the drainage conduit and the filler neck closure further includes a drainage plug mounted for movement in the inclined plug-motion channel formed in the nozzle-insertion housing between a conduit-closing position blocking flow of collected liquid from the outer chamber through the drainage conduit to an outlet end of the drainage conduit and a conduit-opening position allowing flow of collected liquid from the outer chamber through the drainage conduit to the outlet end so that any collected liquid extant in the outer chamber can drain to surroundings through the drainage conduit.

11. The apparatus of claim 10, wherein the inner flapper door is arranged to engage the drainage plug during movement of the inner flapper door from the opened position to the closed position.

12. The apparatus of claim 10, wherein the nozzle-actuated inner flapper door includes an edge portion that is arranged to engage the drainage plug and hold the drainage plug in the conduit-opening position when the nozzle-actuated inner flapper door occupies the closed position and the drainage plug is arranged to move in the inclined plug-motion channel formed in the nozzle-insertion housing to the conduit-opening position in response to movement of the nozzle-actuated inner flapper door to the opened position.

13. The apparatus of claim 12, wherein the fuel-tank filler neck is formed to include a drainage hole aligned with an outlet end of the drainage conduit formed in the nozzle-insertion housing to cause the drainage hole to cooperate with the drainage conduit to define the drain formed in the fill tube.

14. The apparatus of claim 10, wherein the filler neck closure further includes a nozzle-actuated outer flapper door mounted for movement relative to the nozzle-insertion housing to open and close an outer nozzle-receiving aperture opening into the outer chamber and the nozzle-actuated outer flapper door is arranged to lie in spaced-apart relation to the nozzle-actuated inner flapper door to locate the drainage plug therebetween when each of the inner and outer flapper doors is closed.

* * * * *